United States Patent [19]

Cutler et al.

[11] Patent Number: 5,554,575

[45] Date of Patent: Sep. 10, 1996

[54] BIODEGRADABLE AND BIOREMEDIAL ABSORBENT COMPOUND FOR LIQUIDS

[75] Inventors: Thomas D. Cutler, Green Bay; Lane F. Dohl; Raymond F. Dohl, both of DePere; James E. Hauer, Green Bay, all of Wis.

[73] Assignee: Precision Remediation & Supply, Inc., DePere, Wis.

[21] Appl. No.: 339,949

[22] Filed: Nov. 15, 1994

[51] Int. Cl.$^6$ ................................................ C08L 1/02
[52] U.S. Cl. ........................................ 502/404; 106/164.01
[58] Field of Search ............................ 502/404; 106/163.1

[56] References Cited

U.S. PATENT DOCUMENTS

| | | | |
|---|---|---|---|
| 3,769,164 | 10/1973 | Ararowicz | 210/40 |
| 4,240,800 | 12/1980 | Fischer | 502/404 |
| 5,021,390 | 6/1991 | Hatton | 502/404 |

FOREIGN PATENT DOCUMENTS

| | | | |
|---|---|---|---|
| 669205 | 2/1989 | Switzerland | 502/404 |

*Primary Examiner*—David Brunsman
*Attorney, Agent, or Firm*—Andrus, Sceales, Starke & Sawall

[57] ABSTRACT

A biodegradable absorbent compound for liquids, such as petroleum spills, is comprised of processed bagasse, cottonseed hull lint, and mineral oil. Typically the proportions of the ingredients are 75% bagasse, 25% cottonseed hull lint, and less than 0.1% mineral oil.

11 Claims, No Drawings

BIODEGRADABLE AND BIOREMEDIAL ABSORBENT COMPOUND FOR LIQUIDS

Absorbents are routinely used to control spills of various liquids such as oils, solvents and others. These spills occur through leakage of lubricating or cooling liquids from equipment in industrial, commercial and domestic environments, handling, and accident. Often, the spills involve potentially hazardous environmental contaminants. It is necessary to properly collect and dispose of these contaminants. Under some conditions, a chemical liquid spill can be adequately disposed of through dilution using some other fluid, such as water. However, many liquid contaminants are not water soluble and must be handled in some other manner. One approach is to solidify the liquid in some way before collection and disposal. This is usually accomplished through introducing some dry absorbent material onto the liquid contaminant, allowing the material to absorb the liquid, and collecting the material and properly disposing of it according to some prescribed method such as landfill dumping or incineration. New state and federal regulations are rapidly narrowing the number of allowable ways to handle and dispose of liquid wastes.

Up to now, the most widely used compounds to absorb liquid chemical spills have been comprised of some form of calcine clay sold under various brand names such as: "Oil Dry", "Eagle Picher", "Ultra Sorb", and "SpeediDry". This type of absorbent is very heavy, typically packaged in 40 pound bags. These products do absorb liquids, but not very efficiently. Typically, none can absorb more than 1.4 times its own weight. Most can absorb only 0.7 times their own weight. The absorbents do a poor job of collecting and retaining the liquid contaminant. For example, even after proper application of a calcine clay product to a small oil spill on a concrete floor, there will be drops and residue of oil left on the floor after the product has been swept up and dumped into a waste container. There will also be a measurable quantity of liquid oil in the bottom of the waste container in which the used clay product is deposited. Since this product also contains abrasive dust many industrial companies are now viewing it as a wear agent to equipment and potential health hazard and are banning its use within their facilities. The disposal of calcine clay is difficult and expensive. Since it has such a high leaching characteristic, many states are forbidding continuing disposal of such products in landfill dump sites. Because it is a mineral, it is also not a good option for disposal by incineration.

The biodegradable and bioremediatable absorbent compound for liquids of the present invention comprises a practical, cost-effective, and environmentally safe compound for picking up and controlling spills of oils and other liquids. The absorbent components of the compound are all natural organic materials that are environmentally compatible. It is easy to use, biodegradable, safe, and non-toxic. When inoculated with selected microbial strains, the compound will also facilitate the process of degradation of hydrocarbons. Unlike calcine clay, this compound has a rapid wicking action effect and is non-abrasive, it is also highly absorbent, being seen as having the potential of absorbing up to 7 times its weight in liquids. The compound has anti-leaching qualities and leaves a drier, cleaner surface after it is removed from the scene of a liquid spill. The compound can be incinerated or used as a secondary fuel source for energy recovery with less than 3% ash, releasing a minimum of 16,000 Btu per pound plus whatever value contributed by the liquid contaminant absorbed. The compound has a very low affinity for water and will float indefinitely. However, since its affinity for oils and solvents is very high, the compound is very effective for absorbing such spills on water.

The compound is formulated from natural fibers comprised of processed bagasse and cottonseed hull lint. It further preferably includes mineral oil that can serve both as a dust suppressant and a binder. Typically, the proportions of these ingredients, by weight, would be: about 75% bagasse, about 25% cottonseed hull lint, and less than 0.1% mineral oil.

The bagasse is collected and dried, for example, air dried in covered storage. Moisture content of the bagasse at collection is ordinarily rather high, typically in the range of 52–58% by weight. We have discovered that although bagasse has a very high moisture content initially, after it is dried to a range of 6% to 22%, it is highly resistant to absorbing moisture; either ambient humidity or exposure to water. After air-drying the moisture level has been reduced from original levels by 10–15%. The bagasse is then passed through large rotary drying equipment to reduce the moisture content to typically less than 12%, and ideally around 8%. The dried bagasse is combined proportionately with cottonseed hull lint and then chopped and ground through a milling process to produce the desired grind. This compound is then inoculated with microbial strains capable of consuming hydrocarbons, such as petroleum, using overhead spray equipment. Such microbes will remain in a dormant, inactive state until they are activated by the introduction of some catalyzing agent. A suitable catalyzing agent could be water, used after the mixture has absorbed some hydrocarbon contaminant. The microbes normally require oxygen, food (hydrocarbons), sustained moisture on the order or 30%, and suitable temperature (in the range of 35–130 degrees F.) to become activated. After they are activated, the microbes will consume the hydrocarbon wastes at a variable rate as long as the conditions above are present.

Mineral oil is then also added as a dust inhibitor to the compound with similar overhead spray equipment. The mineral oil may also serve as a binder to ensure that the coarser bagasse portion and finer cottonseed hull lint portion remain uniformly mixed. The finished product is bagged and palletized for handling and shipment.

We claim:

1. A biodegradable absorbent compound for liquids comprising a mixture of fibers of bagasse and cottonseed hull lint, said mixture containing a greater amount, by weight, of bagasse fibers than cottonseed hull lint, said bagasse fibers being coarser than said cottonseed hull lint which is finer, said finer cottonseed hull lint in said mixture intermingling between said coarser bagasse fibers, said compound containing a binder for maintaining a uniform mixture of said coarser bagasse fibers and intermingled finer cottonseed hull lint in said biodegradable absorbent compound.

2. The absorbent compound according to claim 1 wherein said binder comprises mineral oil.

3. The absorbent compound according to claim 2 wherein said absorbent compound contains mineral oil in quantities sufficient to act as a dust inhibitor.

4. The absorbent compound according to claim 1 wherein said absorbent compound comprises substantially 75% bagasse and substantially 25% cottonseed hull lint, by weight.

5. The absorbent compound according to claim 4 wherein said binder comprises mineral oil in an amount less that 1% by weight.

6. The absorbent compound according to claim 1 wherein said bagasse has a moisture content in a range of substantially 6% to substantially 22%.

7. The absorbent compound according to claim 6 wherein the moisture content of the bagasse is in a range of substantially 6% to substantially 12%.

8. The absorbent compound according to claim 7 wherein said the moisture of the bagasse is substantially 8%.

9. The absorbent compound according to claim 1 wherein said absorbent compound contains microbial strains.

10. The absorbent compound according to claim 9 wherein said absorbent compound contains microbial strains capable of consuming hydrocarbons.

11. A biodegradable absorbent compound for liquids comprising a mixture of fibers of bagasse and cottonseed hull lint, said mixture containing substantially 75% by weight of bagasse fibers, substantially 25% by weight cottonseed hull lint, and less than 0.1% by weight mineral oil as a binder, said bagasse fibers having a moisture content in a range of substantially 6% to substantially 12%, said bagasse fibers being coarser than said cottonseed hull lint which is finer, said finer cottonseed hull lint in said mixture intermingling between said coarser bagasse fibers, said binder maintaining a uniform mixture of said coarser bagasse fibers and intermingled finer cottonseed hull lint in said biodegradable absorbent compound.

* * * * *